US008095311B2

(12) United States Patent
Shimizu (10) Patent No.: US 8,095,311 B2
(45) Date of Patent: Jan. 10, 2012

(54) IN-VEHICLE NAVIGATION APPARATUS (75) Inventor: Yasuhiro Shimizu, Tokoname (JP)

(73) Assignee: Denso Corporation, Kariya (JP)

(*) Notice: Subject to any disclaimer, the term of this patent is extended or adjusted under 35 U.S.C. 154(b) by 1090 days.

(21) Appl. No.: 11/979,970

(22) Filed: Nov. 13, 2007

(65) Prior Publication Data
US 2008/0125963 A1 May 29, 2008

(30) Foreign Application Priority Data

Nov. 27, 2006 (JP) ................. 2006-318728

(51) Int. Cl.
G01C 21/00 (2006.01)
G06G 7/78 (2006.01)

(52) U.S. Cl. ......... 701/214; 701/201; 701/208; 340/926

(58) Field of Classification Search .................. None
See application file for complete search history.

(56) References Cited

U.S. PATENT DOCUMENTS

| 6,233,519 | B1* | 5/2001 | Yamada | 701/200 |
| 6,259,989 | B1* | 7/2001 | Kusama | 701/208 |
| 6,658,353 | B2* | 12/2003 | Shimizu et al. | 701/214 |
| 7,053,793 | B2* | 5/2006 | Tajima et al. | 340/928 |
| 2005/0168351 | A1* | 8/2005 | Saze et al. | 340/928 |
| 2005/0259003 | A1 | 11/2005 | Wakamatsu | |

FOREIGN PATENT DOCUMENTS

| JP | 09269236 A | * | 10/1997 |
| JP | A-9-269236 | | 10/1997 |
| JP | A-11-295094 | | 10/1999 |
| JP | A-H11-304512 | | 11/1999 |
| JP | A-2000-155034 | | 6/2000 |
| JP | 2001155034 A | * | 6/2001 |
| JP | A-2001-167390 | | 6/2001 |
| JP | 2003240576 A | * | 8/2003 |
| JP | A-2003-240576 | | 8/2003 |
| JP | A-2004-361360 | | 12/2004 |
| JP | 2006003166 A | * | 1/2006 |
| JP | A-2006-003166 | | 1/2006 |

OTHER PUBLICATIONS

First Office Action dated Mar. 11, 2010 issued from the Chinese Patent Office in the corresponding Chinese patent application No. 200710194027.9 (with English translation).

Office Action dated Jul. 22, 2009 from the Korean Patent Office in the corresponding Korean Patent Application No. 10-2007-0121111 (and English translation).

Notice of Reasons for Refusal mailed Jul. 26, 2011 in corresponding JP application No. 2006-318728 (and English translation).

* cited by examiner

Primary Examiner — Thomas Black
Assistant Examiner — Lin B Olsen
(74) Attorney, Agent, or Firm — Posz Law Group, PLC

(57) ABSTRACT

When a vehicle passes through an entrance IC entering a toll road, a present position of the vehicle changes discontinuously because of increased detection error. Continuity is lost between a designated travel road and a history of past designated travel roads. Designation of a correct entrance IC fails. Even in such a case, the correct entrance IC is designated based on the travel road designated before the continuity is lost. A toll is calculated based on the designated entrance IC and an IC, which the vehicle approaches and via which the vehicle is assumed to exit the toll road. If a guide route is designated when passing through an entrance IC, a correct entrance IC is appropriately designated from the travel road and the guide route.

11 Claims, 9 Drawing Sheets

IN-VEHICLE NAVIGATION APPARATUS

CROSS REFERENCE TO RELATED APPLICATION

This application is based on and incorporates herein by reference Japanese Patent Application No. 2006-318728 filed on Nov. 27, 2006.

FIELD OF THE INVENTION

The present invention relates to an in-vehicle navigation apparatus, which guides the vehicle along a toll road and calculates a toll of the toll road.

BACKGROUND OF THE INVENTION

When a toll road is included in a guide route, an in-vehicle navigation apparatus calculates a toll from an entrance interchange via which the vehicle has entered the toll road to an exit interchange, via which the vehicle is assumed to exit the toll road. The calculated toll is notified to a user (see Patent document 1).

An in-vehicle navigation apparatus has a function to re-retrieve a guide route in the following cases: (1) when the present position of the vehicle changes without continuity while the guide route is provided (i.e., when a present position as the result of a map matching process changes significantly from a present position detected by a position detection unit), (2) when the user changes the destination, (3) when the user deviates from the guide route, and (4) when the guide route is obliged to change based on the congestion information from an outside.

The re-retrieval of the guide route is performed from the present position to the destination. If the re-retrieval of the guide route is executed after entering a toll road, data on the entrance IC previously passed through disappears. A toll of the toll road may be unable to be correctly calculated.

In another navigation apparatus, whether a vehicle reaches an entrance interchange is determined independently of the navigation apparatus. The data on the determined entrance IC is stored in memory. Even if a re-retrieval of the guide route is executed, a correct toll up to an exit interchange is calculated with the stored exit interchange referred to. The calculated toll is notified to a user (see Patent document 2).

Patent document 1: JP-H9-269236 A
Patent document 2: JP-H11-295094 A

In the navigation apparatus in Patent document 2, the vehicle having reached an entrance interchange is determined when (i) the present position detected by a position detection unit is near the position of an entrance interchange on map data, and at the same time (ii) a vehicle's window opens and closes or the vehicle stops.

The detected vehicle present position may deviate from an actual present position because of detection error of the position detection unit. To anticipate the above, the vehicle present position on the map data is periodically adjusted (i.e., map matching process is performed) to keep the consistency with the map data in Patent document 2. In the map matching process, the present position is adjusted to the position on the road (link) nearest to the vehicle present position on the map data.

For instance, in an area where roads entering a toll road are close to each other, the map matching process does not function properly, but the following may occur.

Figure 11:
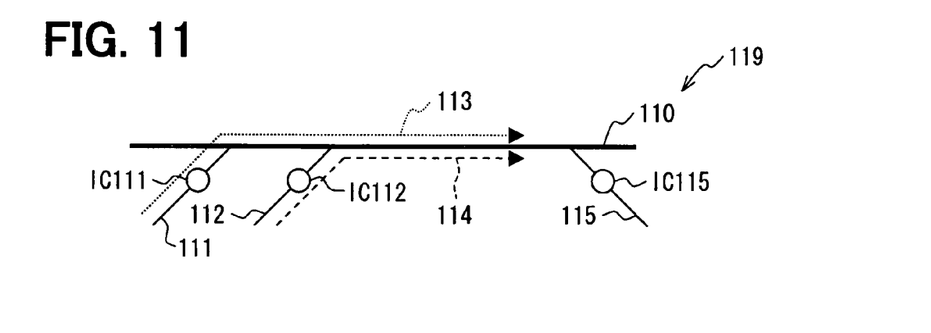
FIG. 11 is a schematic diagram for supplementary explaining an issue.

FIG. 11 illustrates that Roads 111 and 112 connected with Main line 110 of Toll road 119 exist close to each other.

Arrow 113 (broken line) indicates an actual travel locus of the vehicle. The vehicle enters Main line 110 of Toll road 119 via Entrance interchange 111. It is assumed that when the vehicle passes through Entrance interchange 111, the above position detection error arises.

Because of the detection error, the vehicle present position may deviate greatly from Entrance road 111 to be closer to Entrance road 112 having Entrance interchange 112 on the map data. In this case, the vehicle is regarded as being located in Entrance road 112 as a result of the map matching process. The vehicle is therefore incorrectly determined to have entered Toll road 119 via Entrance interchange 112. Hereinafter, it is called "location gap" that the vehicle present position designated on the map deviates from the actual present position because of the detection error. That is, the vehicle present position changes without continuity (refer to above (1)).

In Patent document 2, when the above location gap occurs, Entrance interchange 112 is stored as an entrance interchange, which the vehicle has passed through, and a re-retrieval of the guide route is performed from the present position (i.e., entrance interchange 112). That is, because of the location gap, the travel locus is regarded as Arrow 114 instead of Arrow 113 of the actual travel locus of the vehicle. For example, the vehicle is going to exit Main line 110 of Toll road 119 via Exit interchange 115 of Exit road 115. The toll is calculated from Entrance interchange 112 to Exit interchange 115, instead of being calculated from Entrance interchange 111 to Exit interchange 115. Thus, the incorrect toll may be notified to the user.

SUMMARY OF THE INVENTION

The present invention is made in view of an issue from a location gap. It is an object of the present invention to provide an in-vehicle navigation apparatus which can determine an entrance interchange correctly even when the location gap arises, and calculate a toll correctly.

To achieve the above object, according to an example of the present invention, a navigation apparatus for a vehicle is provided as follows. A present position acquisition unit is configured to acquire a present position of the vehicle. A storage unit is configured to store road data and interchange data having positional data on interchanges being entrance interchanges and exit interchanges of a toll road. A travel road designation unit is configured to designate, in order, travel roads, on which the vehicle travels, based on the acquired present position and the stored road data. An entrance designation unit is configured to designate an entrance interchange via which the vehicle enters the toll road based on the acquired present position and the stored interchange data. An exit determination unit is configured to determine whether the vehicle approaches an exit interchange via which the vehicle exits the toll road after the entrance interchange is designated. A toll calculation unit is configured to calculate a toll from the designated entrance interchange to the approached exit interchange when the vehicle is determined to approach the exit interchange. Here, when discontinuity occurs between the travel roads designated in order, the travel road designation unit designates a travel road designated preceding the discontinuity as a reference travel road and the entrance designation unit designates an entrance interchange based on the reference travel road.

According to another example of the present invention, a navigation apparatus for a vehicle is provided as follows. A present position acquisition unit is configured to acquire a present position of the vehicle. A storage unit is configured to store road data and interchange data having positional data on interchanges being entrance interchanges and exit interchanges of a toll road. A travel road designation unit is configured to designate, in order, travel roads, on which the vehicle travels, based on the acquired present position and the stored road data. An entrance designation unit is configured to designate an entrance interchange via which the vehicle enters the toll road based on the acquired present position and the stored interchange data. An exit determination unit is configured to determine whether the vehicle approaches an exit interchange via which the vehicle exits the toll road after the entrance interchange is designated. A toll calculation unit is configured to calculate a toll from the designated entrance interchange to the approached exit interchange when the vehicle is determined to approach the exit interchange. A route retrieval unit is configured to retrieve a guide route from a present position acquired by the present position acquisition unit to a destination. Here, if the toll road is included in the retrieved guide route and the designated entrance interchange is different from an intended entrance interchange, which is an entrance interchange included in the guide route, the travel road designation unit designates a travel road designated preceding the discontinuity as a reference travel road and the entrance designation unit designates an entrance interchange based on the reference travel road when the discontinuity between the designated travel roads occurs and a designated travel road, which follows the discontinuity, deviates from the retrieved guide route.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (Configuration)

Figure 1:
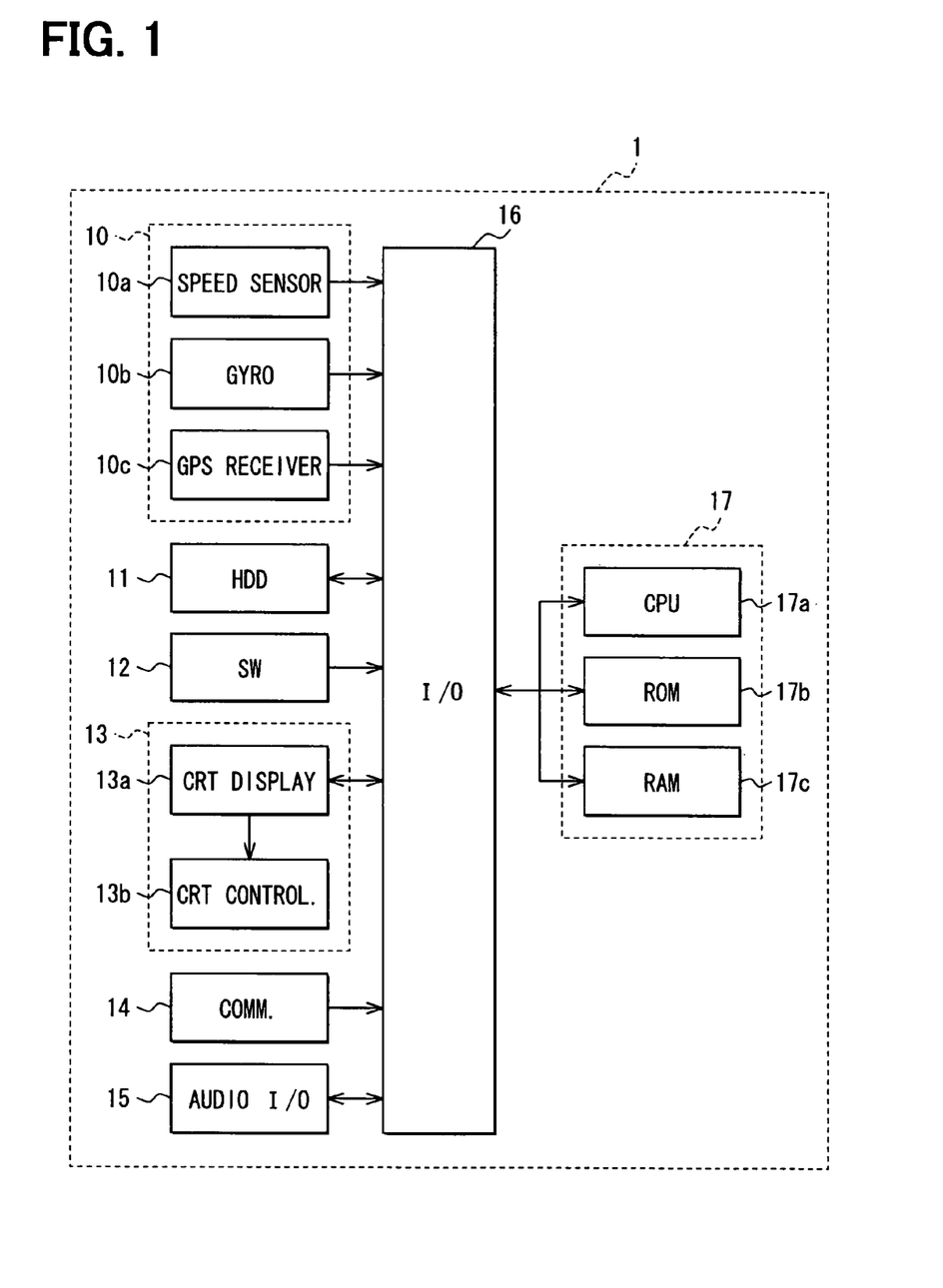
FIG. 1 is a block diagram showing a configuration of an in-vehicle navigation apparatus according to embodiments of the present invention.

An in-vehicle navigation apparatus 1 mounted in a subject vehicle according to embodiments of the present invention is shown in a block diagram of FIG. 1.

The navigation apparatus 1 includes the following: a position detection unit 10 for detecting a present position of the vehicle; a HDD (Hard Disk Drive) device 11 integrated with a data input unit for reading map data in a storage medium; an operation switch group 12 for the user to input operation instructions; a display unit 13 for providing various displays to the user; an external communication device 14 for acquiring information through communication with an outside; a microphone; a speaker; an audio input/output unit 15 including a speech recognition unit; an input/output unit 16; and a control unit 17 connected with the foregoing components via the input/output unit 16.

The position detection unit 10 includes the following detectors: a speed sensor 10a for detecting a vehicle speed by generating pulses according to a rotational frequency of a wheel and measuring the pulses; a gyroscope 10b for detecting a rotation of the vehicle; and a GPS (Global Positioning System) receiver 10c for acquiring latitude and longitude information on a present position of the vehicle by receiving electric waves from satellites for GPS. The position detection unit 10 inputs signals from the individual sensors to the control unit 17 via the input/output unit 16 with a fixed cycle. The control unit 17 determines a present position of the vehicle with a fixed cycle based on the inputted signals.

Map data stored in the HDD device 11 as a storage means or unit includes, as road data, the followings: node data on nodes with latitude and longitude information on nodes; link data on links connecting nodes; cost data associated with the node data and link data for retrieving guide routes; data on toll roads; positional information on entrance interchanges and exit interchanges of toll roads; type data of entrance interchanges and exit interchanges; data on tolls of toll roads (toll list); and data on local roads. The road data further include data for a map matching process and data for drawing maps.

The type data on entrance interchanges and exit interchanges of toll roads indicate types such as a toll collecting point (i.e., toll collection booth) or a point for issuing a ticket indicating an entrance interchange.

The data on toll list summarize tolls between entrance interchanges and exit interchanges of toll roads. If an entrance interchange and exit interchange are designated, a corresponding toll can be calculated using the data on toll list.

The HDD device 11 further contains audio data for guides and speech recognition data, and reads out data according to instructions from the control unit 17 and inputs the read data to the control unit 17 via the input/output unit 16.

The operation switch group 12 is a mechanical switch (e.g., key switch) formed in an instrument panel of the vehicle. The operation switch group 12 receives various operation instructions from the user, and inputs them to the control unit 17 as signals. Moreover, the operation switch group 12 may be a touch switch integrated into the display unit 13. In addition, the operation switch group 12 can be formed in a remote control terminal (not shown) and the instructions, which are carried by electric waves from the remote control terminal, can be received by a sensor (not shown).

The display unit 13 includes a CRT (Cathode Ray Tube) display 13a and a CRT controller 13b, which controls electron beam irradiation on CRT based on instructions from the control unit 17. The display unit 13 provides the user with various display contents. For example, a symbol mark indicating a present position and a guide route from a present position to a destination are displayed in superimposition. The present position indicated by the symbol mark is designated using (i) a present position of the vehicle detected by the position detection unit 10 and (ii) the map data inputted from the HDD device 11. In the present embodiments, although the CRT display 13a is adopted as a display of the display unit 13, a liquid crystal display or an organic EL (Electro Luminescence) display may be adopted.

The audio input/output unit 15 outputs sounds for notifications or guidance for explaining facilities included in the map data via a speaker. The audio input/output unit 15 recognizes speeches for a user to input via a microphone with the speech recognition device and changes the recognized speeches into electric signals to input into the control unit 17. The user can thereby operate the in-vehicle navigation apparatus 1 by inputting speeches via the microphone. The external communication device 14 is a VICS (Vehicle Information and Communication System) receiver to receive congestion information etc. from the VICS center via light beacons, radio wave beacons, or FM (Frequency Modulation) multiplex broadcasting. The beacons are provided along roads.

The input/output unit 16 is, for instance, an interface with an in-vehicle LAN (Local Area Network). While receiving input signals to the control unit 17 from the various components, the input/output unit 16 sends output signals (e.g., instructions) from the control unit 17 to the components.

The control unit 17 includes a microcomputer having a CPU (Central Processing Unit) 17a and its peripherals connected with the CPU via a bus line. The peripherals include a ROM (Read Only Memory) 17b, a RAM (Random Access Memory) 17c, and a semiconductor memory such as a flash memory.

For example, the ROM 17b stores a program, which is read when an electric power is supplied to the navigation apparatus 1. The control unit 17 reads input signals from the various components and the program stored in ROM 17b to the RAM 17c, and executes various processes.

The processes include the following: a designation process for designating a travel road, on which the vehicle travels; an amendment process for amending a history of the designated travel roads of the vehicle in consideration of errors of input signals from the position detection unit 10; a guide route calculation process for calculating an optimal route from a vehicle present position to a destination designated by a user via the operation switch group 12 based on the map data stored in the HDD device 11; and a route guide process for performing a route guide by displaying the calculated route in the display unit 13 or outputting corresponding speeches to the audio input/output unit 15.

The ROM 17b includes definitions of flags required in performing programs or example, the binary flags are as follows: an entrance flag and an exit flag for indicating whether the vehicle enters or exits a toll road; a tool booth flag for identifying on the program whether an entrance IC is a toll collection booth; a discontinuity flag for identifying that the designated travel roads of the vehicle become discontinuous; an amendment-finish flag for indicating that the amendment process is finished; and an error flag for indicating that the amendment process is not finished.

The entrance flag is set to ON upon determining that the vehicle enters a toll road from a local road via an IC based on the vehicle present position, the travel road designated in the above designation process, and position information on ICs obtained from the HDD device 11. That is, the entrance flag is set to ON if the travel road of the vehicle is designated as a local road and the travel road is then designated as a toll road after entering the toll road via an IC. The control unit 17 supposes that the IC is an entrance IC and stores information on the entrance IC (e.g., position information, set flag) in a flash memory.

In contrast, the exit flag is set to ON if the travel road of the vehicle is designated as a toll road with the entrance flag set at ON and the travel road is then designated as a local road after exiting the toll road via an IC. In addition, when the exit flag is set to ON, the already set flag is set to OFF (zero).

The ticketing point flag and the toll booth flag are flags set to ICs according to type data and toll booth data stored in the HDD device 11.

In addition, the definition of a flag indicates as follows. For instance, if the ticketing point flag of a certain IC is set at OFF ("0"), the certain IC is not a ticketing point; if set at ON ("1"), the certain IC is a ticketing point.

(Operation)

Operations of the control unit 17 according to embodiments are explained below.

Embodiment 1

First, the outline of the embodiment 1 is as follows. A present position of the vehicle is calculated. A travel road of the vehicle is designated, in order, one by one based on the calculated present position. The travel roads designated in order are stored as a history. Continuity or discontinuity of the designated travel roads is monitored constantly. The discontinuity may occur in an area where entrance roads entering an elevated road (i.e., toll road) are very close to each other. That is, when the vehicle passes through an entrance IC in the area, the vehicle present positions may change discontinuously because of a location gap due to increase of the detection errors to thereby cause the discontinuity between the designated travel roads. Even if the continuity of the travel roads designated one by one is lost, the correct entrance IC is designated based on the travel road designated before the discontinuity occurs. A toll is then calculated based on thus designated entrance IC and an IC, which the vehicle approaches and via which the vehicle is supposed to exit the toll road.

The above operation is explained in more detail, referring to flow charts and diagrams in FIGS. 2 to 6. Operations illustrated in the flow charts are executed in parallel mutually.

Figure 2:
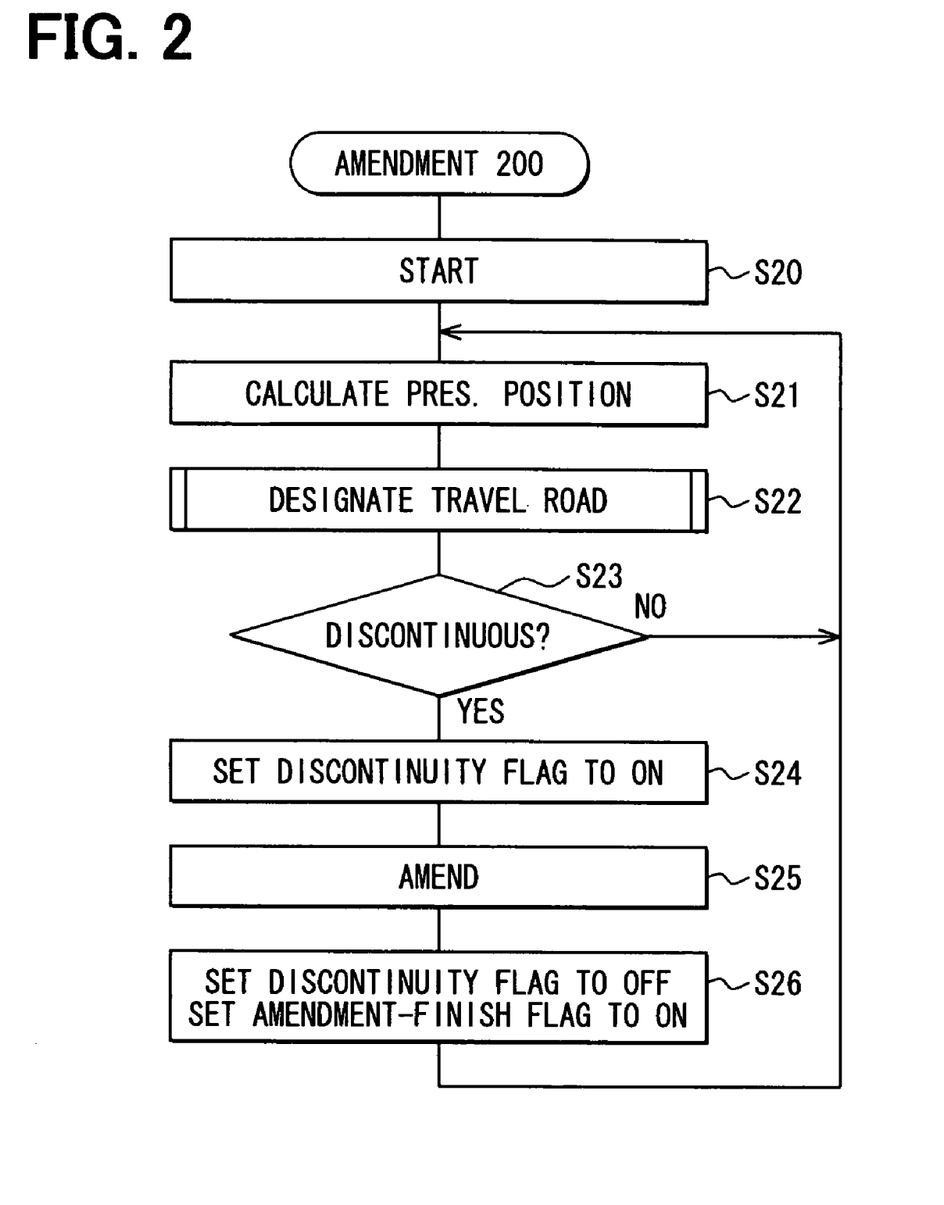
FIG. 2 is a flow chart of an amendment operation by a control unit according to a first embodiment.

First, the flow chart shown in FIG. 2 monitors the continuity of the travel roads designated from the vehicle present position, and indicates an operation for designating correct travel roads. The program (i.e., amendment program 200) managing the amendment operation is stored in the ROM 17b.

The user starts a driving source of the vehicle or turns on an accessory switch (electric power is supplied to the in-vehicle navigation apparatus 1 while the driving source is stopped). Thus, the control unit 17 reads out the amendment program 200 from the ROM 17b, and starts the operation (Step S20).

The control unit 17 calculates a present position of the vehicle based on a signal inputted from the position detection unit 10 (Step S21). Thus, Step S21 executed by the control unit 17 along with the position detection unit 10 may function as a present position acquisition means or unit. The control unit 17 acquires the map data from the HDD device 11, and designates a travel road of the vehicle (Step S22). Thus, Step S22 executed by the control unit 17 may function as a travel road designation means or unit. That is, a node or link in which the vehicle should exist on the map data is designated based on the present position (latitude and longitude information) of the vehicle calculated at Step S21; a travel road is designated based on road data related to the designated node or link. For instance, an allowable error (an angle error and distance error) is predetermined; a node or link is designated such that the calculated present position is within the predetermined allowable error. The vehicle present position is amended to the latitude and longitude related to the designated node or link; a travel road is thereby designated. Information on the designated travel road is stored in the memory as a travel road history. The process proceeds to Step S23.

Figure 3A:
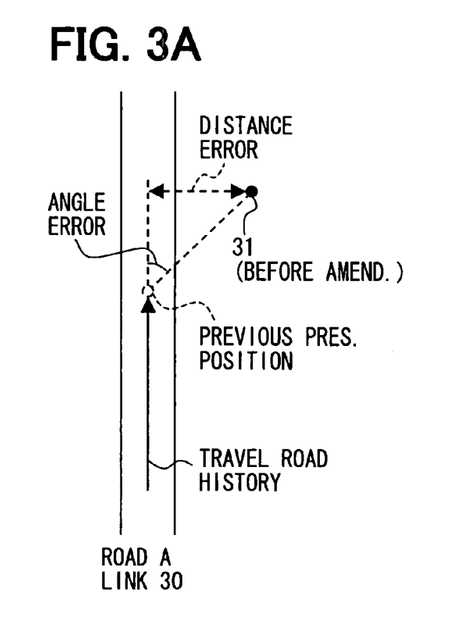
FIGS. 3A, 3B are diagrams for supplementary explaining the amendment operation according to the first embodiment.
Figure 3B:
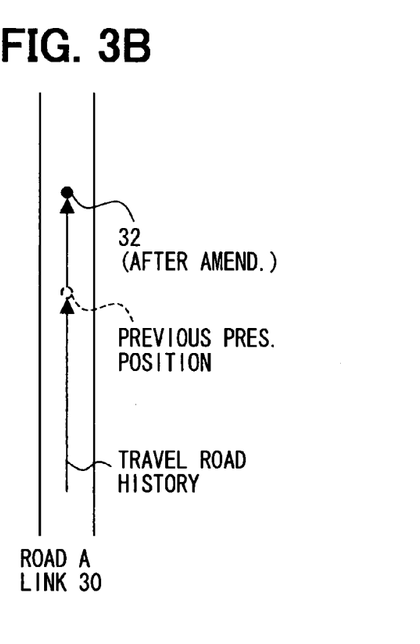

Here, when the calculation error of the vehicle present position exceeds the above allowable error, the designated travel road may change. For example, FIGS. 3A, 3B illustrate a case where a vehicle present position is amended as being on Link 30 corresponding to Road A, and Road A is designated as a travel road. FIG. 3A illustrates a situation before the amendment, and FIG. 3B illustrates a situation after the amendment. As shown in FIG. 3A, although the calculated vehicle present position 31 deviates from Link 30 by a distance error, the distance error falls within the predetermined allowable error. Thus, the vehicle present position 31 is amended as the vehicle present position 32 in FIG. 3B by being drawn to within Link 30 by the amendment.

Figure 4A:
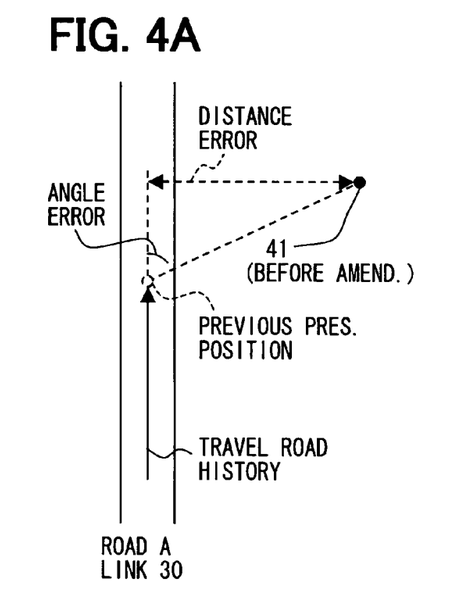
FIGS. 4A, 4B are diagrams for supplementary explaining the amendment operation according to the first embodiment.
Figure 4B:
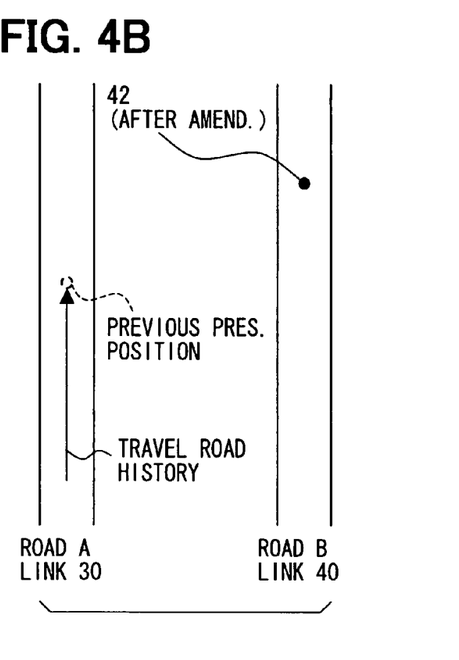

In contrast, if the calculated vehicle present position 41 deviates to exceed the allowable error in the angle and distance, the present vehicle position may be amended as being in Link 40 corresponding to Road B, which is closely parallel with Road A as illustrated in FIG. 4B. FIG. 4A illustrates a situation before the amendment, and FIG. 4B illustrates a situation after the amendment. The calculated vehicle present position 41 in FIG. 4A exceeds the allowable error and comes closer to Link 40. Thus, the vehicle present position 41 is amended as the vehicle present position 42 in Link 40 by the amendment.

That is, discontinuity is generated between two travel roads of (i) the travel road (Road A corresponding to Link 30) designated in the past and (ii) the travel road (Road B corresponding to Link 40) designated after the vehicle present position is amended. Thus, if it is determined whether discontinuity occurs between the designated travel roads, it can be determined whether an incorrect travel road different from an actual travel road is designated because of a location gap.

Thus, it is determined whether the travel road presently designated at Step S22 follows (in series as a traffic flow) another travel road, which is designated in the past and stored in the memory as the travel road history (Step S23). For instance, it is determined whether the road link of the travel road presently designated follows the road link stored as the past travel road history.

With reference to FIG. 11, when a location gap arises, discontinuity (or discrepancy) is generated between (i) a first road link of Entrance road 112 designated as a travel road and (ii) second road links stored up to the present time as a travel road history (the second road links are connected in series as a traffic flow with the road link of Entrance road 111).

When it is determined that the designated travel road becomes discontinuous (YES at Step S23), the process proceeds to Step S24, where the control unit 17 sets the discontinuity flag to ON. The discontinuity flag is set at "1." The process then proceeds to Step S25. On the contrary, when it is determined that it does not become discontinuous (NO at Step S23), it is supposed that the vehicle travels on the travel road designated at Step S22. The process returns to Step S21 and repeats the above steps.

At Step S25, the travel road history is amended so that the continuity of the travel roads may be maintained. For instance, it is determined that the vehicle travels the travel road preceding the discontinuity, and the travel road history is amended accordingly. Here, the travel road preceding the discontinuity may be defined as a reference travel road for estimating an entrance IC the vehicle actually passes through. Then, the discontinuity flag is set to OFF (reset to "0 (zero)") while setting the amendment-finish flag to ON to indicate that the amendment is completed (Step S26).

For example, the operation at Step S25 is explained with reference to FIG. 11. That is, even though the vehicle actually enters Main line 110 of Toll road 119 via Entrance road 111, the vehicle is regarded as having entered Main line 110 via Entrance road 112 because of the location gap. In this case, after the vehicle travels Main line 110, the control unit 17 amends the travel road history to maintain the continuity between the designated travel roads in consideration of Arrow 113. That is, the travel road history is amended on the assumption that the vehicle enters Main line 110 not via Entrance road 112 but via Entrance road 111.

In addition, in setting the discontinuity flag to ON at Step S24 again, if the amendment-finish flag is set at ON, the amendment-finish flag needs to be reset (i.e., set to OFF ("0 (zero)").

Thus, the discontinuity flag and the amendment-finish flag can be used to determine whether (i) a travel road is intentionally changed to another travel road by a user or (ii) a travel road is incorrectly designated according to increased detection error. For example, with reference to FIGS. 4A, 4B, it can be determined whether Road A is changed to Road B intentionally by a user or Road B instead of actual Road A is mistakenly designated after the amendment. In other words, there is a case that the user does not change a travel road intentionally, but an incorrect road is mistakenly designated because of the increased position detection error. Even in this case, a true or correct travel road can be appropriately designated.

Figure 5:
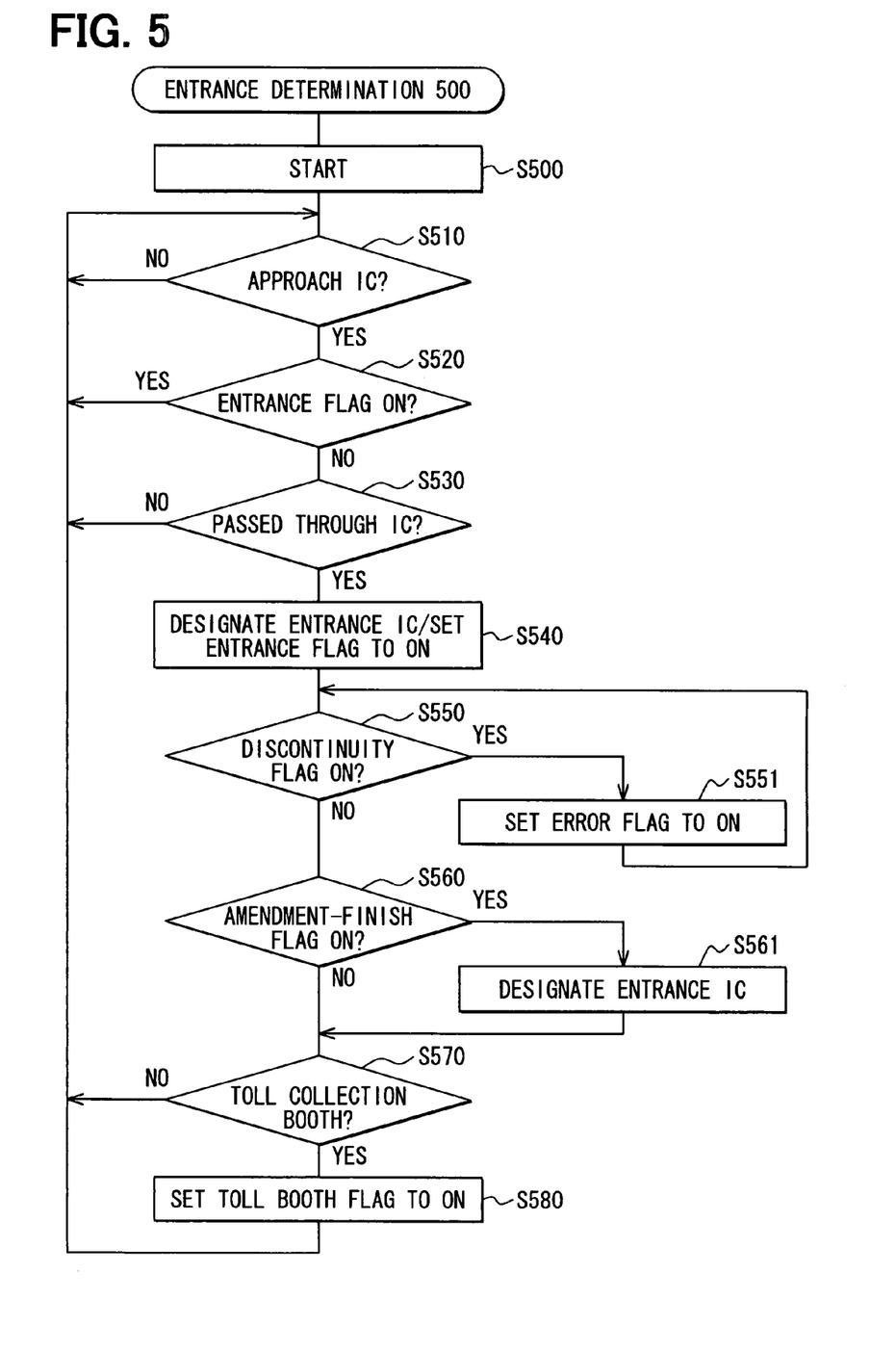
FIG. 5 is a flow chart of an entrance determination operation by the control unit according to the first embodiment.

Next, a flow chart shown in FIG. 5 determines whether a vehicle enters an elevated road (i.e., toll road), and designates an entrance IC correctly. The program (i.e., entrance determination program 500) managing the determination operation is stored in the ROM 17b. A trigger for a start of Step S500 is the same as that of Step S20 in FIG. 2. That is, the trigger is generated when the driving source of the vehicle starts or when the accessory switch turns on. The control unit 17 reads the entrance determination program 500 from the ROM 17b, and starts the operation.

Upon the start of Step S500, the control unit 17 shifts to Step S510, and determines whether the vehicle approaches an entrance IC or an IC, via which the vehicle exit a toll road. Here, for example, the vehicle present position is compared with the position information of ICs in the map data; it is determined whether two are within a predetermined distance.

When it is determined that the vehicle approaches within the predetermined distance of an IC (YES at Step S510), the process proceeds to Step S520. In contrast, when the vehicle does not approach within the predetermined distance of an IC (NO at Step S510), the process stands by until approaching an IC.

Next, it is investigated whether the entrance flag is set at ON first (Step S520). When the entrance flag is not set at ON (NO at Step S520), the IC the vehicle approaches may be an entrance IC of a toll road. The process proceeds to Step S530, where it is determined whether the vehicle passes through the IC, which the vehicle has been approached. This determination is made based on (i) the vehicle present position detected by the position detection unit 10 at Step S21 of the amendment program 200, (ii) the position information on the corresponding IC which the HDD device 11 stores and which the vehicle approaches, and (iii) the travel road designated at Step S22 of the amendment program 200.

When the entrance flag is set at ON (YES at Step S520), it is determined that the vehicle has passed through the entrance IC and the toll road is not yet left. The process returns to Step S510.

When the corresponding IC has been passed through (YES at Step S530), it is supposed that the IC is an entrance IC. While setting the entrance flag to ON, the position information on the IC is stored in the memory (Step S540). Thus, Step S540 executed by the control unit 17 may function as an entrance designation means or unit. The process then proceeds to Step S550. In contrast, when the IC has not been passed through (NO at Step S530), the process returns to Step S510.

At Step S550, it is investigated whether the discontinuity flag is set at ON by the amendment program 200. When the discontinuity flag is set at ON (YES at Step S550), the following is supposed: multiple entrance roads are close to each other; the detection error of the vehicle present position is increased; the vehicle present position is incorrectly amended to a different road. The error flag is set at ON until the amendment by the amendment program 200 is completed and the discontinuity flag is reset to OFF (Step S551). In contrast, when the discontinuity flag is not set at ON (NO at Step S550), the error flag is reset to OFF. The process proceeds to Step S560, where it is investigated whether the amendment-finish flag is set at ON.

When the amendment-finish flag is set at ON (YES at Step S560), it is supposed that the travel roads became discontinuous and the amendment was made to maintain the continuity in the travel road history by the amendment program 200. In this case, the entrance IC may be mistaken and stored. To that end, the control unit 17 designates an IC which the vehicle actually passes through based on the travel road history after being amended (Step S561). In other words, the designated IC is regarded as the true or correct entrance IC and the processes proceeds to Step S570.

Thus, the discontinuity in the travel roads due to a location gap became discontinuous is determined. This can prevent designation of an incorrect entrance IC.

In contrast, when the amendment-finish flag is not set at ON (NO at Step S560), the entrance IC designated at Step S540 is regarded as the correct entrance IC. The process proceeds to Step S570.

Next, it is determined whether the entrance IC is a toll collection booth (or toll collecting point) with reference to the data stored in the HDD device 11 (Step S570). When the entrance IC is a toll collection booth (YES at Step S570), the process proceeds to Step S580, where the toll booth flag is set to ON with respect to the entrance IC. The process returns to Step S510. In contrast, when not being a toll collection booth (NO at Step S570), the process returns to Step S510. Thus, Step S570 executed by the control unit 17 may function as an entrance type determination means or unit.

Thus, referring to the toll booth flag allows determination as to whether a toll for the toll road needs to be prepaid.

According to the above operation, even if the detection error is increased in a condition that entrance roads are close to each other, the designation of an incorrect entrance IC can be prevented.

Figure 6:
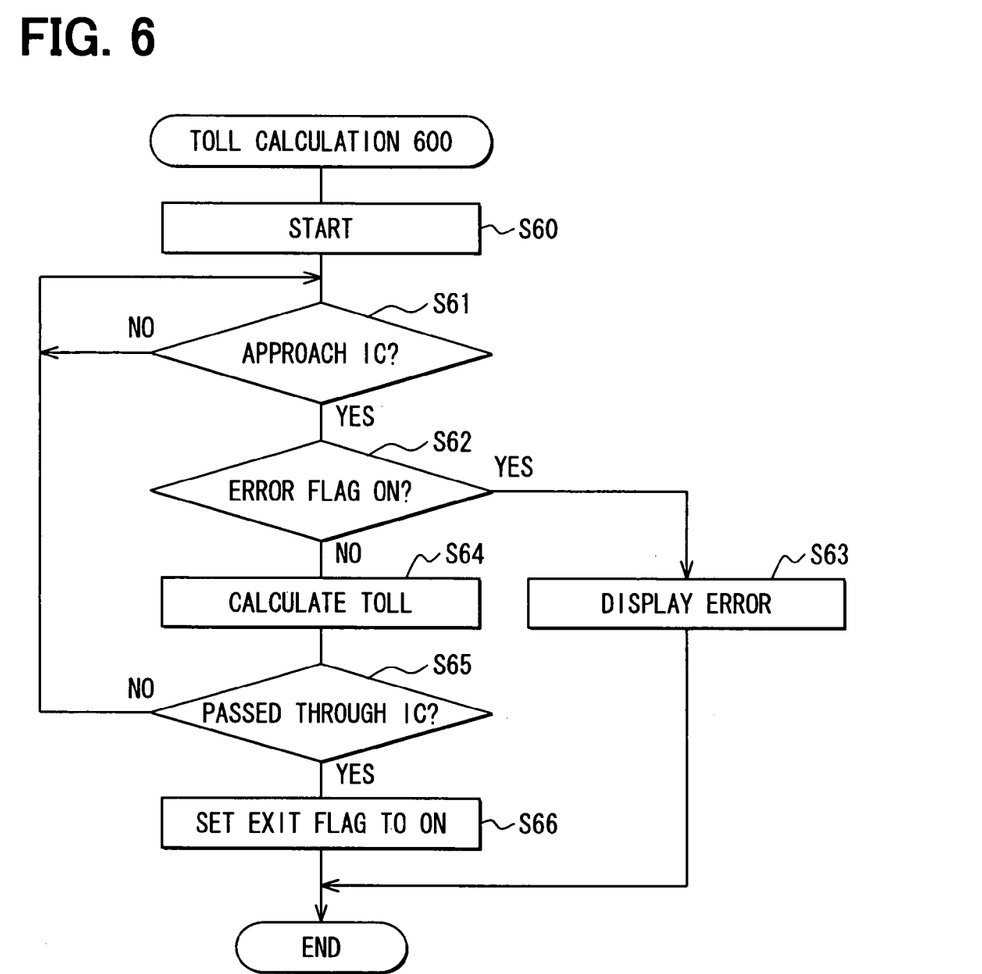
FIG. 6 a flow chart of a toll calculation operation by the control unit according to the first embodiment.

Next, a flow chart shown in FIG. 6 indicates an operation for calculating a correct toll from the designated entrance IC to the IC supposed to be an exit from the toll road when the vehicle is assumed to leave an elevated road (toll road).

The program (i.e., toll calculation program 600) managing the calculation operation is stored in the ROM 17b. A trigger of the start (Step S60) of the operation is generated when the entrance flag is set to ON by the entrance determination program 500 (i.e., when an entrance IC is passed through) and the toll booth flag is not set at ON.

Upon the start of Step S60, the control unit 17 shifts to Step S61, and determines whether the vehicle approaches an IC. This determination is the same as that of Step S510 in the entrance determination program 500. When it is determined that the vehicle approaches an IC (YES at Step S61), the process proceeds to Step S62. In contrast, when the vehicle does not approach an IC (NO at Step S61), the process stands by until approaching an IC.

Next, it is investigated whether the error flag is set at ON by the entrance determination program 500 (Step S62). When the error flag is set at ON (YES at Step S62), it is supposed that the process by the amendment program 200 is not completed. The process proceeds to Step S63, where an error message is displayed for indicating that the calculation of the toll cannot be performed. For example, "toll is unknown" is notified by displaying or announcing.

This can prevent the confusion of a user resulting from notification of an incorrect toll.

In contrast, when the error flag is not set at ON (NO at Step S62), the process proceeds to Step S64. The toll from the entrance IC up to the IC which the vehicle approaches is calculated with reference to the toll list data stored in the HDD device 11. Thus, Steps S61, S62 executed by the control unit 17 may function as an exit determination means or unit; Step S64 executed by the control unit 17 may function as a toll calculation means or unit. The calculated toll is notified by display of the display unit 13 or by audio assist via the audio input/output unit 15 and the speaker. Thus, the display unit 13 or the audio input/output unit 15 may function as a notification means or unit.

The process proceeds to Step S65, where it is determined whether the vehicle passes through the IC, which the vehicle has been approached. This determination is the same as that of Step S530 in the entrance determination program 500. When the corresponding IC is passed through (YES at Step S65), it is supposed that the vehicle passes through an exit IC. The exit flag is set to ON (Step S66), and the process returns to Step S61. Thereby, all the set flags are reset to OFF (zero).

In contrast, when the IC which the vehicle has been approached is not passed through (NO at Step S65), the process returns to Step S61.

Thus, even if a guide route is not designated, an entrance IC of a toll road can be appropriately designated and a toll can be calculated correctly and notified to a user. That is, even if a location gap occurs when entering a toll road connected with mutually closely adjoining entrance roads or ICs, a correct entrance IC can be designated. Therefore, a toll can be notified to a user when approaching an IC, via which the vehicle is supposed to exit a toll road.

As explained above, the above toll calculation program 600 does not calculate a toll when the toll booth flag is set at ON.

The user already paid the toll at the entrance IC of the toll road which requires prepayment of the toll at the entrance IC. Thus, the toll is not repeatedly notified to the user when approaching the IC, via which the vehicle is supposed to exit the toll road. The user can be prevented from feeling troublesome. Moreover, the processing load of the control unit 17 can be also reduced.

In contrast, if the toll booth flag is set at ON, another notification may be adopted when approaching the IC, via which the vehicle is supposed to exit the toll road. For instance, "Toll was already prepaid" can be notified. It is useful when the user forgets having paid the toll carelessly.

Moreover, while the entrance flag is set at ON, even if the driving source is stopped, the data may continue to be stored in the flash memory. Thus, when the driving source is re-started, the stored data can be still referred to.

After entering a toll road, the driving source may be turned off, for instance, when the user takes rest in a service area. In this case, the data of the entrance IC or the flag cannot be eliminated so that a correct toll can be presented to the user.

Embodiment 2

In the embodiment 1, the entrance IC is designated based on the continuity of the past travel road history irrespective of whether the vehicle is navigated along a guide route. When a location gap occurs near an entrance IC with a guide route designated, not only the past travel road history but also the designated guide route can be used for designating the entrance IC more accurately.

An operation by the control unit 17 is explained in more detail, referring to flow charts and diagrams in FIGS. 7 to 10. In the present embodiment, it is assumed that a guide route is designated from a departure point to a destination and a vehicle is navigated along the guide route.

Figure 7:
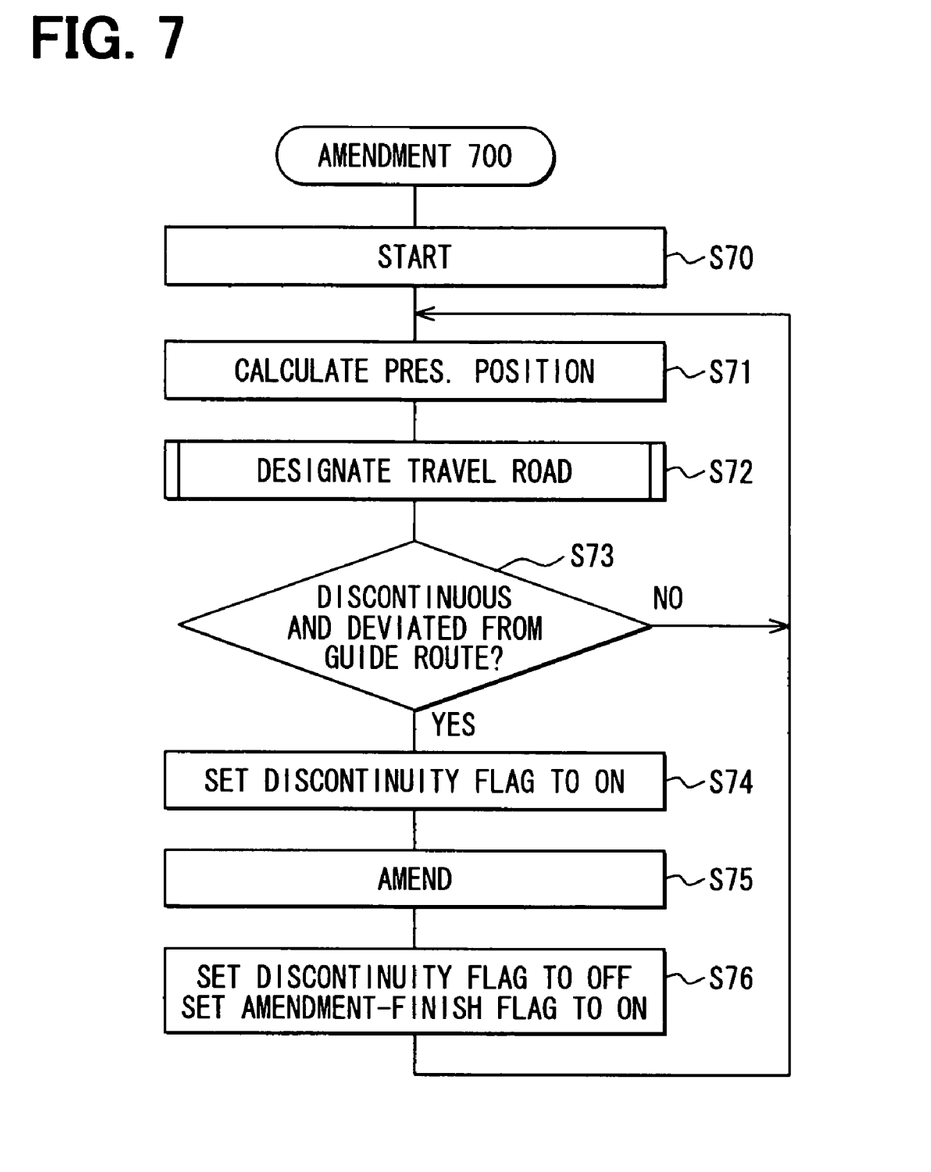
FIG. 7 is a flow chart of an amendment operation by the control unit according to a second embodiment of the present invention.

A flow chart shown in FIG. 7 indicates an operation of the amendment program 700 in the present embodiment. In addition, before the guide route is designated by the user, the amendment program 200 of Embodiment 1 operates.

A trigger of the start of Step S70 is the same as that of Step S20 in FIG. 2. Upon starting the operation, the control unit 17 shifts to Step S71. A vehicle present position is calculated based on the detection signal of the position detection unit 10. A travel road of the vehicle is designated based on the vehicle present position calculated at Step S71 (Step S72). Calculation of the vehicle present position (Step S71) and the designation process of the travel road (Step S72) are not different from those in Embodiment 1.

Next, the control unit 17 determines whether the travel road designated at Step S72 is discontinuous with respect to the past travel road history and at the same time whether the travel road designated at Step S72 is discontinuous with the designated guide route (i.e., whether the travel road designated at Step S72 deviates from the designated guide route) (Step S73).

Figure 8A:
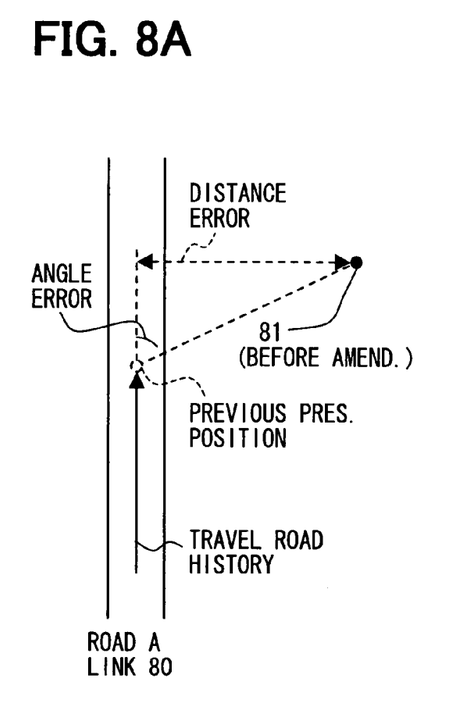
FIGS. 8A, 8B are diagrams for supplementary explaining the amendment operation according to the second embodiment.
Figure 8B:
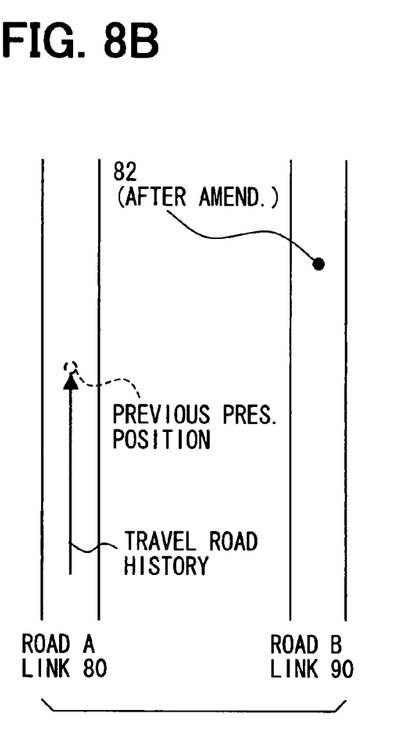

With reference to FIG. 8A, if the calculated vehicle present position 81 deviates to exceed the allowable error in the angle and distance, the present vehicle position may be amended as being in Link 90 corresponding to Road B, which is parallel with Road A (Guide route link 80) as illustrated in FIG. 8B. The vehicle present position 82 after the amendment is drawn in Link 90 corresponding to Road B. The travel roads (travel road history) designated up to the present time and the travel road after the vehicle present position is amended become discontinuous. Further, the travel road after the vehicle present position deviates from the designated guide route.

When it is determined that the designated travel road becomes discontinuous against the travel road history, and at the same time deviates from the guide route (YES at Step S73), the control unit 17 sets the discontinuity flag to ON (Step S74), and the process proceeds to Step S75.

In contrast, when it is determined that the designated travel road is not discontinuous (NO at Step S73), it is supposed that the vehicle travels on the travel road designated at Step S72. The process returns to Step S71 and repeats the above steps.

At Step S75, the travel road history is amended so that the continuity of the travel roads may be maintained. For instance, it is determined that the vehicle travels the travel road preceding the discontinuity, and the travel road history is amended accordingly. Then, the discontinuity flag is reset to OFF ("0 (zero)") while setting the amendment-finish flag to ON to indicate that the amendment is completed (Step S76).

In addition, in setting the discontinuity flag to ON at Step S24 again, if the amendment-finish flag is set at ON, the amendment-finish flag needs to be reset (i.e., set to OFF ("0 (zero)").

Thus, the discontinuity flag and the amendment-finish flag are set based on the discontinuity against the travel road history and guide route; the flags can be used to determine whether (i) a travel road is intentionally changed to another travel road to depart from the guide route by a user or (ii) a travel road is incorrectly designated according to increased detection error.

Figure 9:
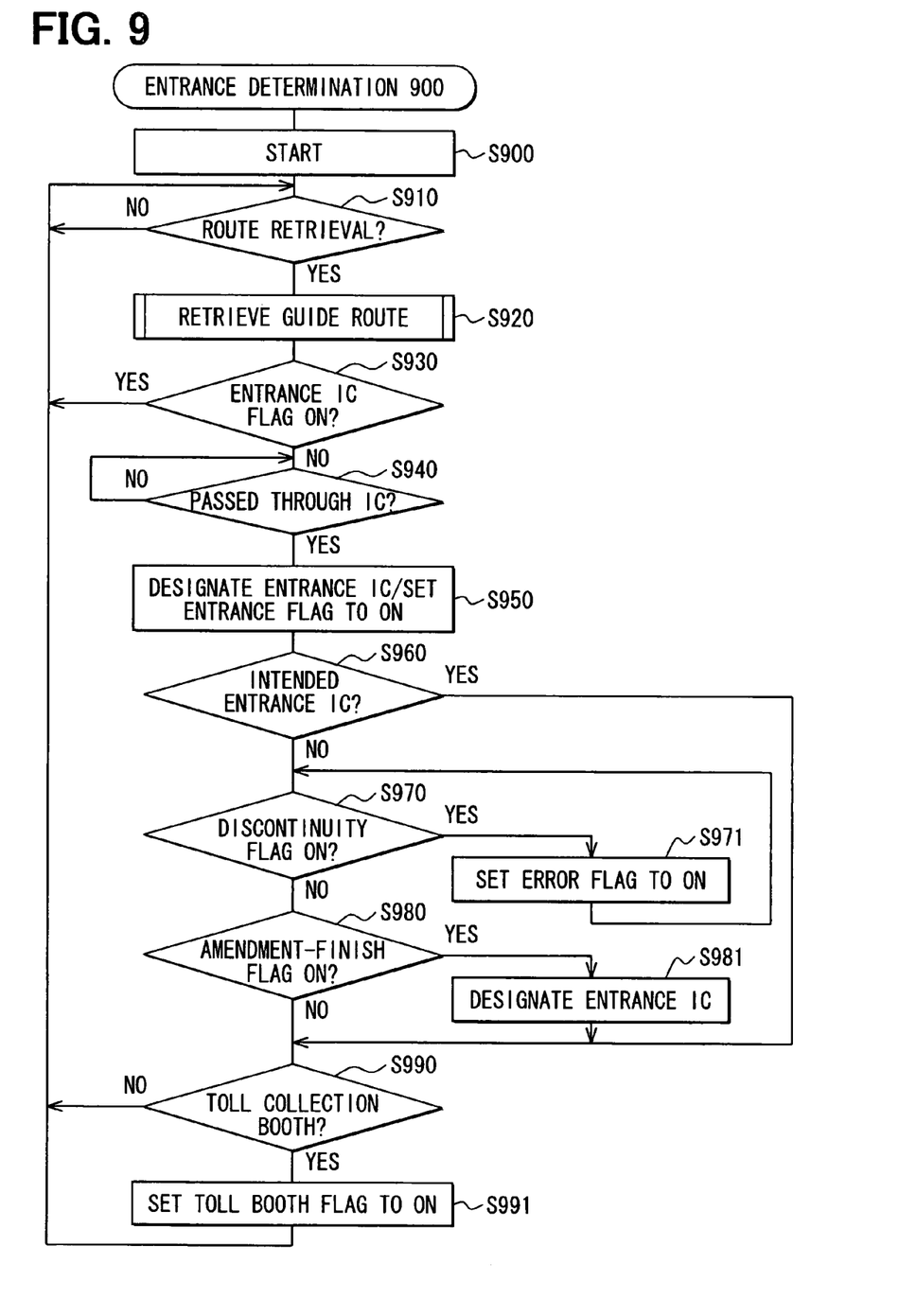
FIG. 9 is a flow chart of an entrance determination operation by the control unit according to the second embodiment.

A flow chart shown in FIG. 9 indicates an operation of the entrance determination program 900 in the present embodiment. In addition, until the guide route is designated by the user, the entrance determination program 500 of Embodiment 1 operates.

A trigger of the start of Step S900 is the same as that of Step S500 in FIG. 5.

Upon the start of Step S900, the control unit 17 stands by until a departure point and a destination are designated by a user and retrieval of a guide route is demanded (Step S910). When the retrieval of a guide route is demanded (YES at Step S910), the process proceeds to Step S920, where a guide route calculation process is executed and a guide route is calculated. Thus, Step S920 executed by the control unit 17 may function as a guide route retrieval means or unit. When the guide route includes a toll road, the toll from an IC supposed to be an entrance IC to an IC supposed to be an exit IC is calculated from the toll list data and notified to the user.

In contrast, when the retrieval is not demanded (NO at Step S910), the process stands by until the retrieval is demanded.

Next, it is determined whether the entrance flag is set at ON (Step S930). When the entrance flag is set at ON (YES at Step S930), it is supposed that the vehicle has already entered the toll road. The process returns to Step S910. In contrast, when the entrance flag is not set at ON (NO at Step S930), it is supposed that the vehicle has not entered the toll road. The process proceeds to Step S940.

It is determined whether the vehicle passes through an IC (Step S940). This determination is the same as that of Step S510 or S530 in FIG. 5. When an IC is passed through (YES at Step S940), the process proceeds to Step S950, where it is supposed that the IC is an entrance IC, and the entrance flag is set to ON. In contrast, when the IC is not passed through (NO at Step S940), the process returns to Step S940.

It is determined whether the IC designated at Step S950 is an intended entrance IC, which is included in the guide route and is intended or assumed to be passed through (Step S960). When being an intended entrance IC (YES at Step S960), the process proceeds to Step S990. When not being an intended entrance IC, the process proceeds to Step S970.

The steps from Step S970 to Step 981 is to determine either (a) or (b): (a) whether the entrance IC designated at Step S950 is mis-designated because of a location gap; or (b) as a result of the user's intentionally departing from the guide route, the vehicle enters the toll road via an IC different from the intended entrance IC.

It is investigated whether the discontinuity flag is set at ON by the amendment program 700 (Step S970). When the discontinuity flag is set at ON (YES at Step S970), the following is supposed: multiple entrance roads are close to each other; the detection error of the vehicle present position is increased; the vehicle present position is incorrectly designated to a different road. The error flag is set at ON until the amendment by the amendment program 700 is completed and the discontinuity flag is reset to OFF (zero) (Step S971). In contrast, when the discontinuity flag is not set at ON (NO at Step S970), the error flag is reset to OFF. The process proceeds to Step S980, where it is investigated whether the amendment-finish flag is set at ON.

When the amendment-finish flag is set at ON (YES at Step S980), it is supposed that the travel roads became discontinuous and the vehicle deviated from the guide route so the amendment was made to maintain the continuity in the travel road history by the amendment program 700. In this case, the entrance IC may be incorrectly stored. To that end, the control unit 17 designates an IC which the vehicle actually passes through based on the travel road history after being amended (Step S981). In other words, the intended entrance IC included in the guide route is regarded as the correct entrance IC and the processes proceeds to Step S990.

The travel road may become discontinuous against the travel road history and deviates from the guide route, even though the vehicle passed through the intended entrance IC and entered the toll road. In this case, the above configuration of Embodiment 2 can prevent incorrect designation of an entrance IC.

In contrast, when the amendment-finish flag is not set at ON (NO at Step S980), the entrance IC designated at Step S950 is regarded as the correct entrance IC. That is, it is determined that the user intentionally departs from the guide route. To that end, to change the guide route, the control unit 17 performs a re-retrieval of a guide route or the like. The process then proceeds to Step S990.

Subsequent Step 990 and Step S991 are completely the same as Step S570 and Step S580 of the flow chart shown in FIG. 5, respectively; therefore, explanation is omitted.

Figure 10:
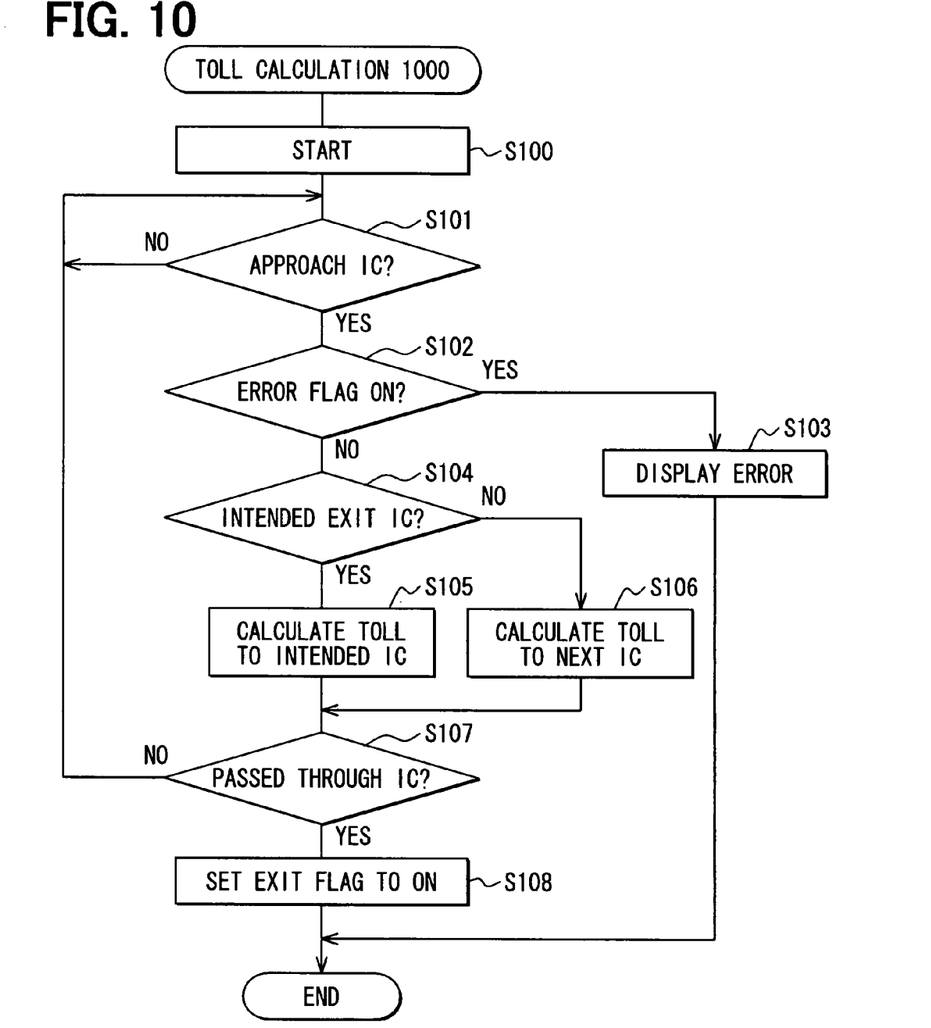
FIG. 10 is a flow chart of a toll calculation operation by the control unit according to the second embodiment.

A flow chart shown in FIG. 10 indicates an operation of the toll calculation program 1000 in the present embodiment. In addition, until the guide route is designated by the user, the toll calculation program 600 of Embodiment 1 operates.

A trigger of the start of Step S100 is the same as that of Step S60 in FIG. 6. Upon the start of Step S100, the control unit 17 shifts to Step S101, and determines whether the vehicle approaches an IC. This determination is the same as that of Step S61 in FIG. 6.

Subsequent Step 102 and Step S103 are completely the same as Step S62 and Step S63 of the flow chart shown in FIG. 6, respectively; therefore, explanation is omitted.

Next, it is determined whether an IC, which the vehicle approaches is an intended exit IC, which is included in the designated guide route (Step S104). This determination is made, for instance, by comparing the position of the intended exit IC with the position of the IC which the vehicle approaches. When the IC which the vehicle approaches is the intended exit IC (YES at Step S104), the process proceeds to Step S105, where the toll is calculated from the entrance IC designated by the entrance determination program 900 to the intended exit IC and notified to the user. The process proceeds to Step S107.

When the IC which the vehicle approaches is not the intended exit IC (NO at Step S104), the process proceeds to Step S106, where the toll is calculated from the entrance IC designated by the entrance determination program 900 to the IC which the vehicle approaches. Notification of the toll may be executed automatically or only when the user's instruction is received via the operation switch group 12. This prevents notification of a toll each time the vehicle approaches any exit IC, which is different from the intended exit IC via which the user intends to leave the toll road; therefore, the user can be prevented from the troublesomeness from the useless notifications. In contrast, a toll may be calculated with respect to the IC which the vehicle approaches. This can be useful when the user intends to change the schedule to thereby leave the toll road via the IC different from the intended exit IC and wants the notification of the toll to the corresponding exit IC.

It is determined whether the vehicle passes through an IC, which the vehicle approaches (Step S107). This Step is completely the same as Step S65 shown in FIG. 6.

Since Step S108 is also the same as Step S66 shown in FIG. 6, explanation is omitted.

Thus, if a guide route is designated, an entrance IC of a toll road can be similarly appropriately designated and a toll can be calculated properly and notified to a user. That is, even if a location gap occurs when entering a toll road connected with mutually closely adjoining entrance roads or ICs, a correct entrance IC can be designated. Therefore, a toll can be notified to a user when approaching an IC, via which the vehicle is supposed to exit a toll road.

As explained above, the above embodiments can prevent notification of the incorrect toll as a result of mis-designation of an incorrect IC because of a location gap. This can prevent user's confusion and can notify a user of a correct toll.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, a navigation apparatus for a vehicle is provided as follows. A present position acquisition unit is configured to acquire a present position of the vehicle. A storage unit is configured to store road data and interchange data having positional data on interchanges being entrance interchanges and exit interchanges of a toll road. A travel road designation unit is configured to designate, in order, travel roads, on which the vehicle travels, based on the acquired present position and the stored road data. An entrance designation unit is configured to designate an entrance interchange via which the vehicle enters the toll road based on the acquired present position and the stored interchange data. An exit determination unit is configured to determine whether the vehicle approaches an exit interchange via which the vehicle exits the toll road after the entrance interchange is designated. A toll calculation unit is configured to calculate a toll from the designated entrance interchange to the approached exit interchange when the vehicle is determined to approach the exit interchange. Here, when discontinuity occurs between the travel roads designated in order, the travel road designation unit designates a travel road designated preceding the discontinuity as a reference travel road and the entrance designation unit designates an entrance interchange based on the reference travel road.

If a location gap arises, travel roads designated one by one becomes discontinuous. The designated travel road preceding the discontinuity is designated as an actual or reference travel road; an entrance interchange to the toll road is designated based on the reference travel road. Thus, if a location gap arises because of increase of the position detection error when a vehicle enters a toll road connected to entrance roads, which are close to each other, an incorrect entrance interchange, instead of a correct entrance interchange, via which the vehicle has actually entered, may be designated as an entrance interchange to the toll road. Even in this case, the actual correct entrance interchange can be re-designated under the above structure.

Once the entrance interchange is designated, the vehicle needs to leave the toll road via an exit interchange even if a guide route is not designated. Thus, when the exit interchange is approached, the correct toll can be calculated from the correct entrance interchange.

In addition, that the travel roads designated one by one become discontinuous means that the continuity disappears between the travel road designated at a certain point and another travel road designated before the certain point. For example, with reference to FIG. 11, the location gap occurs and it is determined that the vehicle travels on Entrance road 112 instead of Entrance road 111, which is an actual travel road. Since there is no continuity between Entrance road 112 determined to be the present travel road and Entrance road 111 previously designated as a travel road, the designated travel roads become discontinuous with respect to a traffic flow. In this case, because of occurrence of the location gap, a travel road designated is changed.

As a second aspect, a route retrieval unit may be further configured to retrieve a guide route from a present position acquired by the present position acquisition unit to a destination. Here, if the toll road is included in the retrieved guide route and the designated entrance interchange is different from an intended entrance interchange, which is an entrance interchange included in the guide route, the travel road designation unit designates the designated travel road preceding the discontinuity as a reference travel road and the entrance designation unit designates an entrance interchange based on the reference travel road when the discontinuity between the designated travel roads occurs and a designated travel road, which follows the discontinuity, deviates from the retrieved guide route.

Generally, when a guide route is designated, the user may intentionally separate the vehicle from the guide route. Alternatively, when a location gap causes an entrance interchange different from a correct entrance interchange (or an intended entrance interchange) to be designated, the designated travel roads become discontinuous and the vehicle deviates from the guide route.

In this case, the designated travel road preceding the discontinuity is re-designated as an actual or reference travel road; an entrance interchange to the toll road is re-designated based on the reference travel road. Thus, if a location gap arises because of increase of the position detection error when a vehicle enters a toll road connected to roads, which are close to each other, an incorrect entrance interchange, instead of a correct entrance interchange, via which the vehicle has actually entered, may be designated as an entrance interchange to the toll road. Even in this case, the actual correct entrance interchange can be re-designated under the above structure. Moreover, since the guide route is designated, the entrance interchange can be designated more appropriately.

As a third aspect, a notification unit may be further configured to notify a user of the calculated toll. That is, the above configuration helps prevent the user from being confused from a notification of an incorrect toll resulting from mis-determination of the entrance interchange due to the location gap.

As a fourth aspect, when the approached exit interchange is different from an intended exit interchange, which is an exit interchange included in the retrieved guide route, the calculated toll may not be notified.

This prevents notification of a toll each time the vehicle approaches any exit interchange, which is different from an exit interchange via which the user intends to leave the toll road; therefore, the user can be prevented from feeling the troublesomeness due to the useless notifications.

In addition, the user may intentionally depart from the guide route and leave the toll road via an exit interchange different from the originally intended exit interchange. In this case, although the above configuration does not notify the user of the toll to the exit interchange which is not the intended exit interchange, the toll may be notified according to the user's additional instruction.

As a fifth aspect, if the discontinuity occurs, an error message may be notified until the entrance designation unit designates an entrance interchange.

When the location gap arises and an operation for re-designating an entrance interchange via which the vehicle actually enters the toll road is performed, the operation may not be completed before the vehicle approaches an exit interchange or an intended exit interchange. In this case, since the correct entrance interchange is not designated, a correct toll cannot be calculated. Then, if an error message is notified in this case, the user can be prevented from being confused from the notification of the incorrect toll.

The error message herein can include a display or an audio guidance indicating that the toll is uncalculated.

As a sixth aspect, an entrance type determination unit may be further configured to determine whether the designated entrance interchange is a toll collecting point based on the interchange data, wherein the interchange data further include data for identifying whether the entrance interchange is a toll collecting point. Here, when the entrance interchange is determined to be a toll collecting point, the toll may be not calculated.

A toll may be paid at an entrance interchange to a toll road. In this case, when the vehicle approaches an exit interchange or intended exit interchange, the toll is not calculated. Thus, the toll already paid once is not notified again. This can prevent the user from feeling the troublesomeness.

On the other hand, in spite of having prepaid the toll at the entrance interchange, the user may forget it when approaching the exit interchange. So, if the entrance interchange is a toll collecting point (i.e., toll collection booth), the notification unit can notify the user of having already paid the toll at the entrance interchange.

As a seventh aspect, the navigation apparatus of the first aspect is used under the condition that a guide route is designated. That is, the navigation apparatus of the seventh aspect is provided as follows. A present position acquisition unit is configured to acquire a present position of the vehicle. A storage unit is configured to store road data and interchange data having positional data on interchanges being entrance interchanges and exit interchanges of a toll road. A travel road designation unit is configured to designate, in order, travel roads, on which the vehicle travels, based on the acquired present position and the stored road data. An entrance designation unit is configured to designate an entrance interchange via which the vehicle enters the toll road based on the acquired present position and the stored interchange data. An exit determination unit is configured to determine whether the vehicle approaches an exit interchange via which the vehicle exits the toll road after the entrance interchange is designated. A toll calculation unit is configured to calculate a toll from the designated entrance interchange to the approached exit interchange when the vehicle is determined to approach the exit interchange. A route retrieval unit is configured to retrieve a guide route from a present position acquired by the present position acquisition unit to a destination. Here, if the toll road is included in the retrieved guide route and the designated entrance interchange is different from an intended entrance interchange, which is an entrance interchange included in the guide route, the travel road designation unit designates a travel road designated preceding the discontinuity as a reference travel road and the entrance designation unit designates an entrance interchange based on the reference travel road when the discontinuity between the designated travel roads occurs and a designated travel road, which follows the discontinuity, deviates from the retrieved guide route.

It will be obvious to those skilled in the art that various changes may be made in the above-described embodiments of the present invention. However, the scope of the present invention should be determined by the following claims.

What is claimed is:

1. A navigation apparatus for a vehicle, the apparatus comprising:
   a present position acquisition unit configured to acquire a present position of the vehicle;
   a storage unit configured to store road data and interchange data, including positional data related to entrance interchanges and exit interchanges of a toll road;
   a control unit comprising:
      a travel road designation unit configured to designate, in order, travel roads, on which the vehicle travels, by amending present positions acquired by the present position acquisition unit, based on the stored road data, while considering an allowable error between the acquired present position and the stored road data,
      an entrance designation unit configured to designate an entrance interchange, by which the vehicle enters the toll road, based on the acquired present position and the stored interchange data, and
      an exit determination unit configured to determine whether the vehicle approaches an exit interchange, by which the vehicle exits the toll road, after the entrance interchange is designated; and
   a toll calculation unit configured to calculate a toll from the designated entrance interchange to the approached exit interchange when the vehicle is determined to approach the exit interchange, wherein
   when the entrance designation unit designates an entrance interchange, the control unit is configured to determine whether a discontinuity has occurred between the travel roads in an order designated by the travel road designation unit, and
   when it is determined that the discontinuity has occurred, the control unit is further configured to
      i) designate a travel road, which was designated as such prior to the occurrence of the discontinuity, as a reference travel road used in estimating an entrance interchange actually passed through, instead of designating as the reference travel road, a travel road designated as such posterior to the occurrence of the discontinuity, and
      ii) re-designate an entrance interchange based on the designated reference travel road, whereas the toll calculation unit is further configured to calculate a toll from the entrance interchange re-designated by the control unit to the approached exit interchange when the vehicle is determined to approach the exit interchange.

2. The navigation apparatus of claim 1, further comprising:
   a route retrieval unit configured to retrieve a guide route from a present position acquired by the present position acquisition unit to a destination, wherein
   if the toll road is included in the retrieved guide route and the entrance interchange designated by the entrance designation unit is different from an intended entrance interchange, which is an entrance interchange included in the guide route,
   the control unit is configured to make a determination as to whether (i) the discontinuity between the designated travel roads occurs and (ii) a travel road, which is designated as such posterior to the occurrence of the discontinuity, deviates from the retrieved guide route; and
   when the determination is affirmed, the control unit is configured to
      (i) designate the travel road designated as such prior to the occurrence of the discontinuity as the reference travel road and
      (ii) re-designate an entrance interchange based on the reference travel road.

3. The navigation apparatus of claim 2, further comprising:
   a notification unit configured to notify a user of the calculated toll, wherein
   when the approached exit interchange is different from an intended exit interchange, which is an exit interchange included in the retrieved guide route, the calculated toll is not notified.

4. The navigation apparatus of claim 1, further comprising:
   a notification unit configured to notify a user of the calculated toll.

5. The navigation apparatus of claim 4, wherein
   if the discontinuity occurs, an error message is notified until the entrance designation unit designates an entrance interchange.

6. The navigation apparatus of claim 1, further comprising:
   an entrance type determination unit configured to determine whether the designated entrance interchange is a toll collecting point based on the interchange data, wherein the interchange data further include data for identifying whether the entrance interchange is a toll collecting point, wherein
   when the entrance interchange is determined to be a toll collecting point, the toll is not calculated.

7. A navigation apparatus for a vehicle, the apparatus comprising:
   a present position acquisition unit configured to acquire a present position of the vehicle;
   a storage unit configured to store road data and interchange data including positional data related to entrance interchanges and exit interchanges of a toll road;
   a control unit comprising:
   a travel road designation unit configured to designate, in order, travel roads, on which the vehicle travels, by amending present positions acquired by the present position acquisition unit, based on the stored road data while considering an allowable error between the acquired present position and the stored road data,
   an entrance designation unit configured to designate an entrance interchange, by which the vehicle enters the toll road, based on the acquired present position and the stored interchange data, and
   an exit determination unit configured to determine whether the vehicle approaches an exit interchange, by which the vehicle exits the toll road, after the entrance interchange is designated;
   a toll calculation unit configured to calculate a toll from the designated entrance interchange to the approached exit interchange when the vehicle is determined to approach the exit interchange; and a route retrieval unit configured to retrieve a guide route from a present position acquired by the present position acquisition unit to a destination, wherein when the entrance designation unit designates an entrance interchange, the control unit is configured to determine whether a discontinuity has occurred between the travel roads in an order designated by the travel road designation unit, when it is determined that the discontinuity has occurred, the control unit is further configured to
  i) designate a travel road, which was designated as such prior to the occurrence of the discontinuity, as a reference travel road used in estimating an entrance interchange actually passed through, instead of designating as the reference travel road, a travel road designated as such posterior to the occurrence of the discontinuity, and
    (ii) re-designate an entrance interchange based on the reference travel road, whereas the toll calculation unit is further configured to calculate a toll from the entrance interchange re-designated by the control unit to the approached exit interchange when the vehicle is determined to approach the exit interchange, and wherein, if the toll road is included in the retrieved guide route and the entrance interchange designated by the entrance designation unit is different from an intended entrance interchange, which is an entrance interchange included in the guide route, the control unit is configured to make a determination as to whether (i) the discontinuity between the designated travel roads occurs and (ii) a travel road, which is designated posterior to the occurrence of the discontinuity, deviates from the retrieved guide route; and when the determination is affirmed, the control unit is configured to
  (i) designate the travel road designated prior to the occurrence of the discontinuity as a reference travel road and
  (ii) re-designate an entrance interchange based on the reference travel road.

8. The navigation apparatus of claim 7, further comprising:
a notification unit configured to notify a user of the calculated toll.

9. The navigation apparatus of claim 8, wherein
when the approached exit interchange is different from an exit interchange, which leaves the toll road and is included in the retrieved guide route, the calculated toll is not notified.

10. The navigation apparatus of claim 8, wherein
if the discontinuity occurs, an error message is notified until the entrance designation unit designates an entrance interchange.

11. The navigation apparatus of claim 7, further comprising:
an entrance type determination unit configured to determine whether the designated entrance interchange is a toll collecting point based on the interchange data, wherein the interchange data further include data for identifying whether the entrance interchange is a toll collecting point, wherein
when the entrance interchange is determined to be a toll collecting point, the toll is not calculated.

\* \* \* \* \*